June 26, 1951
J. I. HAASE
2,558,684
FLUID MOTOR SYSTEM FOR OPERATING TIRE
BUILDING DRUMS AND THE LIKE
Filed Aug. 6, 1947
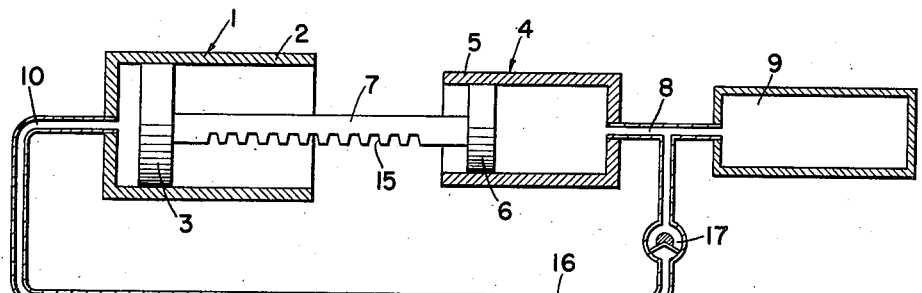
FIG. 1
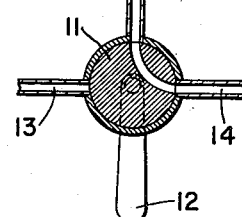
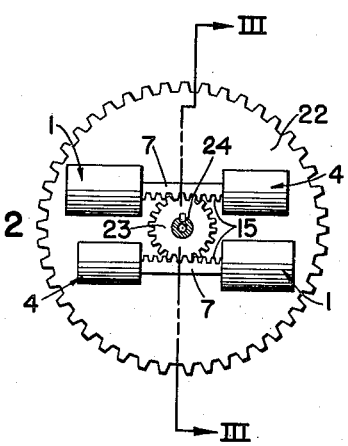
FIG. 2
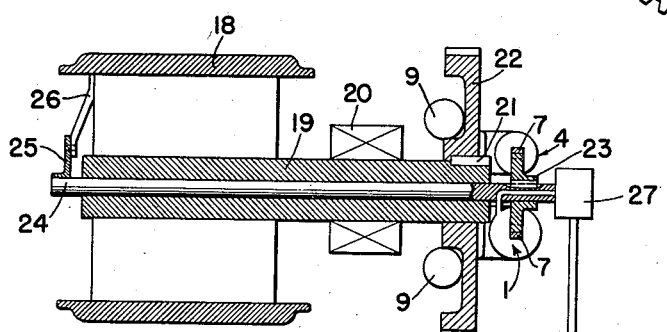
FIG. 3
*INVENTOR.*
JORGEN I. HAASE
BY
ATTORNEY Patented June 26, 1951

2,558,684

UNITED STATES PATENT OFFICE 2,558,684

FLUID MOTOR SYSTEM FOR OPERATING TIRE BUILDING DRUMS AND THE LIKE

Jorgen I. Haase, Akron, Ohio, assignor to Wingfoot Corporation, Akron, Ohio, a corporation of Delaware Application August 6, 1947, Serial No. 766,619

5 Claims. (Cl. 154—9)

This invention relates to fluid pressure motors, and, more particularly, is concerned with pressure cylinder systems in combination with tire building drums, or the like.

It is the general object of the invention to provide a fluid motor system in combination with a rotary tire building drum wherein a single pressure conduit, when opened or shut, will control positive movement of the building drum to either expanded or collapsed position.

Another object of the invention is the provision of opposed fluid pressure cylinders of different diameter associated with a pressure reservoir normally holding the cylinders in one operative position, the pistons in the pressure cylinders moving to the other operative position when supplied with fluid under pressure from a single conduit.

Another object of the invention is to provide in an apparatus of the type previously described, means for automatically replenishing the fluid in the fluid pressure motor.

Another object of the invention is to provide improved, simplified mechanism for collapsing and expanding a tire building drum or other rotary member.

The foregoing objects of the invention, and other objects which will become apparent as the description proceeds, are achieved by the provision, in combination with a tire building drum or the like, of a pair of pressure cylinders of different diameter, the cylinders usually being positioned in opposed relation, means, such as a piston rod, connecting the pistons of the cylinders, a fluid pressure reservoir connected to the back side of the piston of the smaller diameter cylinder and normally forcing the pistons of the cylinder to the end of their travel in one direction, and means for supplying fluid under pressure to the back side of the piston of the larger diameter cylinder to move the pistons in the opposite direction to the end of their travel. Usually incorporated in the combination are means for replenishing the fluid pressure in the reservoir upon each application of fluid pressure to the larger diameter cylinder.

For a better understanding of the invention, reference should be had to the accompanying drawings, wherein:

Fig. 1 is a diagrammatic sectional view of one combination of apparatus incorporating the principles of the invention;

Fig. 2 is an end elevation of the apparatus of Fig. 1 incorporated with a rotary tire building drum; and Fig. 3 is a longitudinal sectional view taken substantially on line III—III of Fig. 2.

Although the invention is particularly concerned with collapsing and expanding a rotary tire building drum, and has been so illustrated and will be so described, it will be recognized that the invention can be used in other relations as limited by the claims without departing from the spirit and scope of the invention.

Having reference to Fig. 1 of the drawings, the numeral 1 indicates generally a fluid pressure motor including a cylinder 2 and a piston 3. Associated with the fluid pressure motor 1 is a second fluid pressure motor 4 having a cylinder 5 and a piston 6. It will be noted that the fluid pressure motor 4 is of smaller diameter than the fluid pressure motor 1. The fluid pressure motors are usually mounted in opposed, closely adjacent position, although the invention is not limited to mounting the cylinders closely adjacent to each other, and some suitable means, such as a piston rod 7, is used to connect the pistons 3 and 6 together so that they move simultaneously.

The cylinder 5 is connected in any suitable manner, as by a conduit 8, with a fluid pressure reservoir 9, the fluid pressure in the reservoir 9 normally urging the piston 6, and thus the piston rod 7 and the piston 3, to the limit of the extent of movement in one direction, as to the left in Fig. 1. Preferably air or some other gas is employed as the fluid pressure medium, although it is to be specifically understood that a liquid may be used as the fluid pressure medium, and in the case where a liquid is used, then the fluid pressure reservoir 9 includes in addition to the liquid, a trapped body of compressible gas.

Connected to the cylinder 2, at the left or back side of the piston 3, is a pressure conduit 10 which extends to a valve 11 having an operating handle 12 and a pressure line 13 and an exhaust line 14 connected thereto. Moving the handle 12 of the valve will connect the conduit 10 to either the pressure line 13 or the exhaust line 14.

In the operation of the assembly just described, it will be evident that the fluid pressure medium in the fluid pressure reservoir 9 will normally keep the pistons 3 and 6 to the left of their respective cylinders, at which time the conduit 10 will be connected through the valve 11 to the exhaust line 14. However, when the handle 12 of the valve is thrown to bring the pressure line 13 into connected relation with the conduit 10, then the pressure in the line 13 will flow behind the piston 3, and this piston, being of larger diameter than the piston 6, will cause the pistons 3 and 6 to move to the limit of their other direction of movement, namely, to the right in Fig. 1. Thus, an arrangement is provided whereby a single pressure line 13 controlled by a single valve 11 will cause positive movement of a fluid pressure motor system in two directions. Any suitable work can be done by the pistons, and this is usually accomplished by connecting to the piston rod 7 in one manner or another, as by a rack 15 secured to the piston rod and engageable with a pinion which will be driven in opposite directions upon the movement of the pistons in opposite directions.

In order to periodically replenish the fluid pressure in the reservoir 9, a conduit 16 extends from the conduit 10 to the conduit 8, and in this conduit is provided a check valve 17 which will allow the flow of fluid into the conduit 8, but which closes when the valve 11 is connected to the exhaust line 14, to thereby trap the fluid under pressure in the reservoir 9 and behind the piston 6. Instead of the one-way check valve 17, it is possible to use a restricted orifice, but this construction is not as preferable as the use of a check valve.

In Figs. 2 and 3 is shown an application of the fluid motor system of Fig. 1 to a rotatable tire building drum which is adapted to be expanded or collapsed. More particularly, in Fig. 3 the numeral 18 indicates the tire building drum which is mounted upon a hollow shaft 19 journaled for rotary movement in bearing 20. Also secured to the shaft 19, as by a key 21, is a bull gear 22 which is adapted to be driven in known manner by a pinion and motor (not shown).

Mounted on the side of the bull gear 22 are fluid pressure motors 1 and 4. Two pairs of such motors are shown in order to provide a high factor of safety or operativeness without undesirably increasing the diameters of the motors, the pistons of each pair of the fluid motors being connected by a piston rod 7 as described in conjunction with Fig. 1. The piston rods 7 carry racks 15 which engage with opposite sides of a pinion 23 which is secured to a rod 24 extending through the hollow shaft 19. The rod 24 has secured to its end opposite the pinion 23 an arm 25 which is pivotally connected by links 26 with movable portions of the tire building drum 18 so that relative rotary movement between the rod 24 and the shaft 19 effects the collapsing of the building drum 18, and relative rotary movement in the opposite direction effects the expanding of the drum 18.

Fluid under pressure is applied to the motors 1 by the conduit 13 through the valve 11 and through a rotary slip joint or coupling 27 mounted upon the end of the rod 24 adjacent the pinion 23 and connecting to a bore formed in an end portion of the rod 24 and extending to the conduits coupling the pairs of cylinders together. The fluid pressure reservoirs 9 are mounted on the other side of the bull gear 22. The conduit arrangement and the operation of the apparatus of Figs. 2 and 3 is as described in conjunction with the form shown in Fig. 1, it being understood that throwing the handle 12 of the valve 11 to connect either the pressure line 13 or the exhaust line 14 with the fluid pressure motors 1 will either collapse or expand the tire building drum 18 inasmuch as the fluid pressure motors will act to rotate the pinion 23 either in one direction or the other relative to the shaft 19.

From the foregoing, it will be evident that the various objects of the invention have been achieved by the provision of apparatus including a single pressure line for moving a fluid motor system in one direction or the other, so as to effect the collapsing or expanding of a rotary tire building drum, or the like, either while the drum is moving or while it is stationary. The apparatus is relatively simple and fool proof, and is adapted to operate positively over long periods of time with little or no attention and repair. Means are associated with the fluid motor system for automatically replenishing the fluid pressure in the reservoir tanks, and for maintaining the balance of the system.

While in accord with the patent statutes, the invention has been specifically illustrated and described in conjunction with one best known embodiment thereof, it is to be particularly understood that the invention is not to be limited thereto or thereby, but that the scope of the invention is defined in the appended claims.

What is claimed is:

1. In combination with a collapsible tire building drum including a shaft for supporting and rotating the drum, a bull gear mounted on and adapted to drive the shaft, oppositely acting fluid pressure cylinders mounted on the bull gear, pistons in the cylinders, means connecting the pistons together, means operated by the last-named means for expanding and collapsing the drum, one of the fluid pressure cylinders being larger than the other, a single fluid pressure supply conduit rotatably connected to the smaller cylinder on the back side of the piston therein and to the larger cylinder on the back side of the piston therein an exhaust conduit, a pressure tank carried on the bull gear and being connected to the smaller cylinder or the back side of the piston therein, and a valve connected in the single fluid pressure supply conduit, said exhaust conduit connecting to said valve which can connect said exhaust conduit to said larger cylinder on the back side of the piston therein.

2. In combination, a collapsible tire building drum, a shaft for supporting and rotating the drum, opposed fluid pressure cylinders of different diameter mounted for rotation with the drum, means connecting the pressure cylinders to the drum to effect the collapse or expansion thereof, a fluid pressure line connected to the larger cylinder to move the drum parts in one direction, a fluid pressure storage chamber mounted for rotation with the drum and connected to the smaller cylinder to move the drum parts in the other direction when a fluid is exhausted from the fluid pressure line, and a pressure line having a one-way check valve for replenishing pressure in the storage chamber.

3. In a machine of the class described, the combination with a collapsible tire building drum, of means for rotating said drum, fluid operated means carried by the drum for collapsing and expanding said drum, a single stationary supply conduit for supplying the operating fluid to said fluid operated means while the drum rotates, and stationary valve means in the conduit for collapsing or expanding the drum while it rotates.

4. In a machine of the class described, the combination with a collapsible and expansible drum, of fluid operated means rotatable with the drum for collapsing said drum, a single stationary supply conduit for supplying the operating fluid to said fluid operated means while the drum rotates, and means rotatable with the drum for expanding said drum and automatically operable upon release of said fluid operated means, comprising a fluid pressure chamber and an element connected to said fluid operated means and movable thereby to build up pressure in said chamber, when said drum is being collapsed, whereby said element will be acted upon by said pressure to expand said drum when said fluid operated means is rendered inoperative.

5. In combination with a collapsible tire building drum including a hollow shaft for supporting and rotating the drum, a bull gear mounted on and adapted to drive the shaft, a rod extending through the shaft, means at one end of the rod connected to the drum to collapse or expand it upon relative rotation of the rod and shaft, a pinion gear carried by the other end of the rod adjacent the bull gear, opposed fluid pressure cylinders mounted on the bull gear, pistons in the cylinders, a piston rod connecting the pistons together, a rack mounted on the piston rod and engaging the pinion gear, one of the fluid pressure cylinders being larger than the other, a fluid pressure supply conduit, a pressure and exhaust valve connected to the conduit, a connector rotatably secured to the rod, a conduit extending from the pressure and exhaust valve to the connector, said rod being hollow for a portion of its length and connected to the smaller cylinder on the back side of the piston therein, a check valve in said conduit permitting flow of fluid to the cylinder, a pressure storage tank mounted on the bull gear and connected to the smaller cylinder on the back side of the piston therein, and a conduit connected from the hollow portion of the rod to the larger cylinder on the back side of the piston therein.

JORGEN I. HAASE.

REFERENCES CITED

The following references are of record in the file of this patent:

UNITED STATES PATENTS

| Number | Name | Date |
|---|---|---|
| 204,914 | Prince | June 18, 1878 |
| 214,603 | Westinghouse | Apr. 22, 1879 |
| 495,499 | List | Apr. 18, 1893 |
| 563,612 | Omick | July 7, 1896 |
| 588,913 | Omick | Aug. 24, 1897 |
| 1,007,105 | Hill | Oct. 31, 1911 |
| 1,480,937 | Gottschalk | Jan. 15, 1924 |
| 1,816,829 | DeLeeuw | Aug. 4, 1931 |
| 1,860,342 | Heston | May 24, 1932 |
| 1,949,752 | Maynard | Mar. 6, 1934 |
| 2,319,643 | Sternad et al. | May 18, 1943 |
| 2,394,464 | McChesney | Feb. 5, 1946 |
| 2,443,551 | Beam | June 15, 1948 |

FOREIGN PATENTS

| Number | Country | Date |
|---|---|---|
| 613,588 | Germany | May 22, 1935 |